US008850937B2

(12) United States Patent
Kaiser et al.

(10) Patent No.: US 8,850,937 B2
(45) Date of Patent: Oct. 7, 2014

(54) METHOD OF MANUFACTURING SEGMENTED STATOR CORES

(75) Inventors: Edward L. Kaiser, Orion, MI (US); Peter J. Savagian, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 450 days.

(21) Appl. No.: 13/173,045

(22) Filed: Jun. 30, 2011

(65) Prior Publication Data
US 2013/0000455 A1 Jan. 3, 2013

(51) Int. Cl.
*B21D 28/22* (2006.01)
*H02K 15/02* (2006.01)

(52) U.S. Cl.
CPC .................................... *H02K 15/02* (2013.01)
USPC .................................. 83/50; 83/255; 83/405

(58) Field of Classification Search
USPC ........... 83/41, 55, 50, 40, 255, 405, 684, 681, 83/687; 29/596
See application file for complete search history.

(56) References Cited

U.S. PATENT DOCUMENTS

| | | | |
|---|---|---|---|
| 4,494,030 A | 1/1985 | Mulach et al. | |
| 7,120,985 B2 * | 10/2006 | Nouzumi | 29/596 |
| 7,562,439 B2 * | 7/2009 | Yamamoto et al. | 29/732 |
| 8,127,429 B2 * | 3/2012 | Saito et al. | 29/596 |
| 8,161,625 B2 * | 4/2012 | Akita | 29/596 |
| 8,193,681 B2 * | 6/2012 | Umeda et al. | 310/216.011 |
| 8,205,320 B2 * | 6/2012 | Akita | 29/596 |
| 2005/0050714 A1 * | 3/2005 | Hashimoto et al. | 29/596 |
| 2011/0225805 A1 * | 9/2011 | Ikeda et al. | 29/596 |
| 2012/0056503 A1 * | 3/2012 | Confalonieri | 310/216.009 |
| 2012/0086302 A1 * | 4/2012 | Hashimoto et al. | 310/216.004 |
| 2012/0223609 A1 * | 9/2012 | Kojima | 310/216.041 |

* cited by examiner

*Primary Examiner* — Omar Flores Sanchez
(74) *Attorney, Agent, or Firm* — Quinn Law Group, PLLC (57) ABSTRACT

A method of manufacturing a stator core is disclosed. The method includes advancing a blank at each of a plurality of press cycles to form a segment at each of the press cycles and shaping the segments. Shaping the segments further includes activating a tooth punch, activating a mounting-ear punch, and activating an joint punch. The method also includes separating the segments from the blank.

13 Claims, 5 Drawing Sheets

METHOD OF MANUFACTURING SEGMENTED STATOR CORES

TECHNICAL FIELD

This disclosure relates to electric machines and, more specifically, to stators for electric machines.

BACKGROUND

An electric motor uses electric potential energy to produce mechanical energy through the interaction of magnetic fields and current-carrying conductors. The reverse process, using mechanical energy to produce electrical energy, is accomplished by a generator or dynamo. Other electric machines, such as motor/generators, combine various features of both motors and generators.

Electric machines may include an element rotatable about a central axis. The rotatable element, which may be referred to as a rotor, may be coaxial with a static element, which may be referred to as a stator. The electric machine uses relative rotation between the rotor and stator to produce mechanical energy or electrical energy.

SUMMARY

A method of manufacturing a stator core is provided. The method includes advancing a blank at each of a plurality of press cycles, such that each of the press cycles forms a segment, and shaping the segments. Shaping the segments further includes activating a tooth punch, activating a mounting-ear punch, and activating an joint punch. The method also includes separating the segments from the blank.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
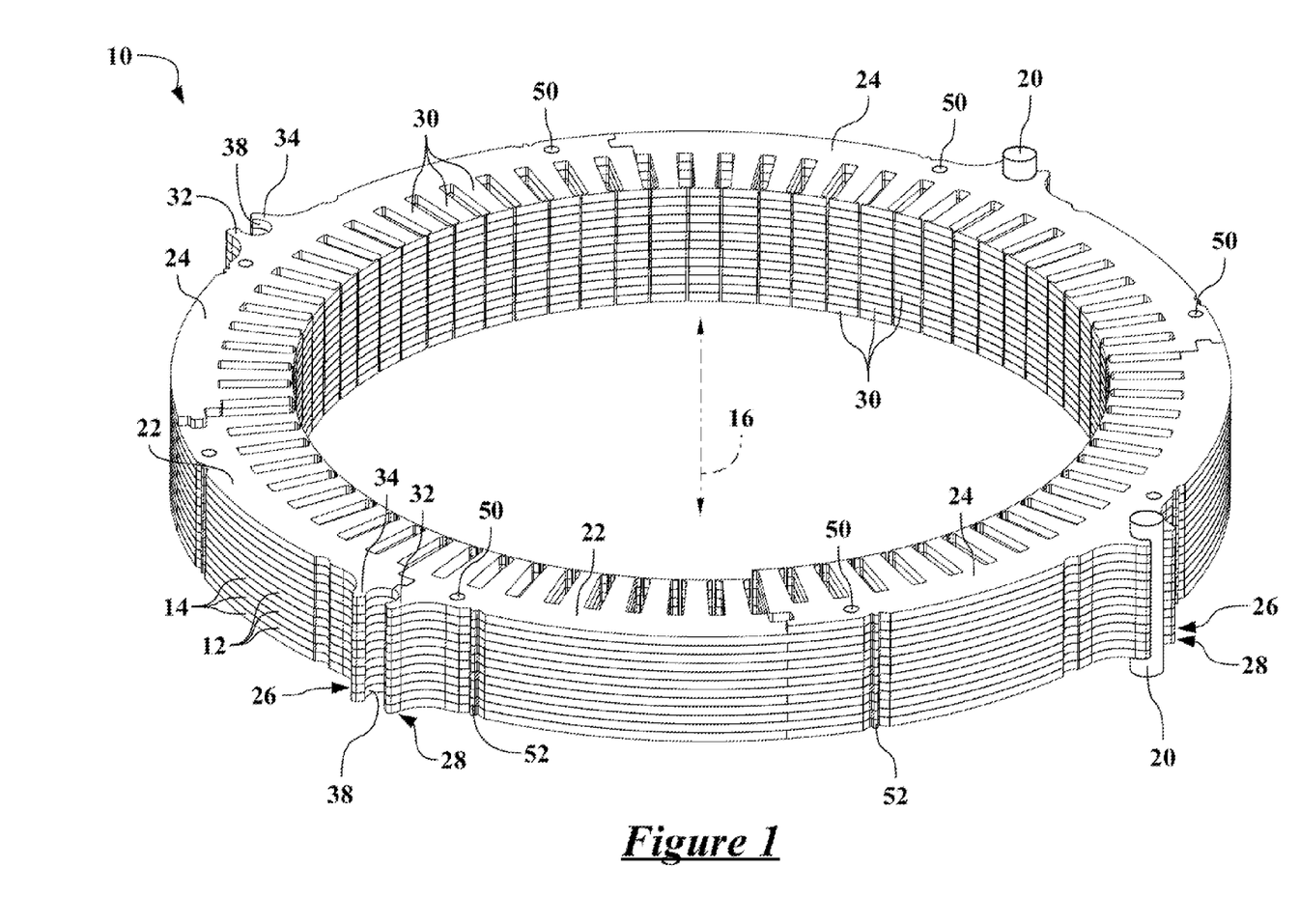
FIG. 1 is a schematic, isometric view of a stator core formed from a plurality of first segments and a plurality of second segments.
Figure 2:
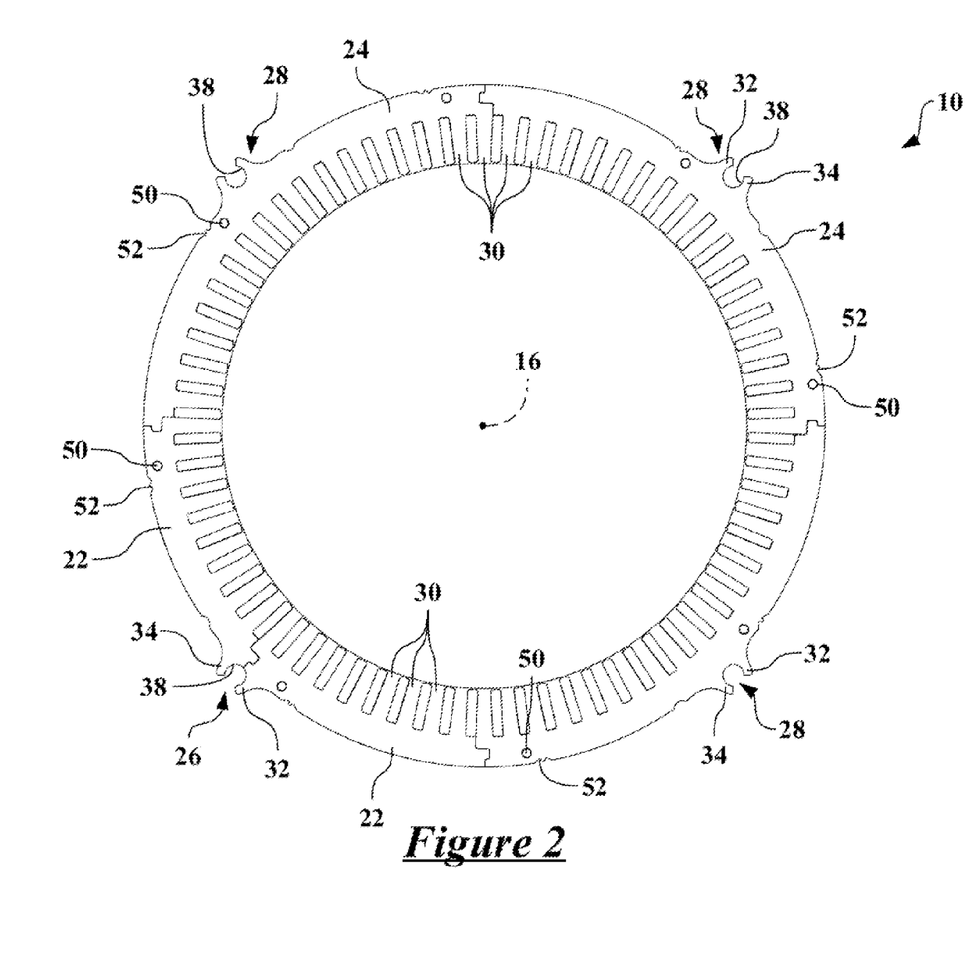
FIG. 2 is a schematic, top view of the stator core shown in FIG. 1.

Referring to the drawings, wherein like reference numbers correspond to like or similar components whenever possible throughout the several figures, there is shown in FIG. 1 and FIG. 2 two schematic views of a stator core 10. FIG. 1 shows an isometric view of the stator core 10 and FIG. 2 shows a top view. Features and components shown in other figures may be incorporated and used with those shown in FIGS. 1-2.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The stator core 10 is shown partially assembled in FIGS. 1-2, and may be used to construct a stator (not shown). The stator core 10 may be one component of an electric machine (not shown), such as an electric motor, generator, or motor/generator.

The stator core 10 includes one or more first layers or first laminations 12 and one or more second layers or second laminations 14. The first laminations 12 and second laminations 14 are arranged or stacked in alternating layers to form the stator core 10 shown in FIGS. 1-2. The first laminations 12 and the second laminations 14 are aligned with a common axis 16, and are rotated relative to each other about the common axis 16 such that the first laminations 12 are offset relative to the adjacent or adjoining second laminations 14, such that a bricklayer type pattern is formed. The angle of rotation between adjacent first laminations 12 and second laminations 14 is not orthogonal (i.e., is not ninety degrees).

In the stator core 10 shown in FIGS. 1-2, the first laminations 12 are rotated by approximately forty-five degrees about the central axis 16 relative to the second laminations 14. However, the first laminations 12 may be rotated about the common axis 16 by other relative orientations, such as approximately forty to fifty degrees or thirty to sixty degrees relative to the second laminations 14.

The stator core 10 is configured to interface with one or more locating features 20. The locating features 20 may mate or attach to a housing or support (not shown) of the electric machine into which the stator core 10 is incorporated, or the locating features 20 may be incorporated into the housing. Alternatively, the locating features 20 may be configured to attach to a transmission housing (not shown) when the stator core 10 is part of a transmission or hybrid transmission (not shown). The locating features 20 are shown only schematically to illustrate the location relative to the first laminations 12 and the second laminations 14. The locating features 20 may be, for example and without limitation: pins, dowels, bosses extending from the surrounding component, or fasteners.

The first laminations 12 are formed from a plurality of first segments 22, and the second laminations 14 are formed from a plurality of second segments 24. The first segments 22 cooperate to define the first laminations 12 as individual layers of the stator core 10, and the second segments 24 cooperate to define the second laminations 14 as individual layers of the stator core 10. Therefore, each first lamination 12 and second lamination 14 may actually be viewed as defined by a single layer of the first segments 22 and the second segments 24, respectively.

The first lamination 12 and the second lamination 14 shown are formed from four of the first segments 22 and four of the second segments 24, respectively. However, other numbers of segments may be used to create the layers of the stator core 10.

Because the angle of rotation between adjacent first laminations 12 and second laminations 14 is not orthogonal, the interfaces or joints between the first segments 22 and also the second segments 24 are not stacked over each other. Therefore, a bricklayer type pattern is formed by the first segments 22 and the second segments 24. When viewed from the side or an isometric view (as in FIG. 1) the joint lines between first segments 22 or second segments 24 are alternating every other layer.

The first segments 22 have a plurality of first mounting ears 26, and the second segments 24 have a plurality of second mounting ears 28. The first mounting ears 26 and the second mounting ears 28 are configured to mate or interface with the locating features. The second segments 24 have the second mounting ears 28 formed centrally by each of the second segments 24. However, for the first segments 22, the first mounting ears 26 are formed of the ends by two adjacent first segments 22. In the stator core 10 shown in FIG. 1, the number of first mounting ears 26 and second mounting ears 28 per layer matches the number of segments per layer. However, the differing combinations of ears and segments may be used to form the stator core 10.

A plurality of stator teeth 30 may be used to support and align stator windings (not shown) in winding slots formed between the stator teeth 30. The stator windings are conductive wires or cables through which current may flow during operation of the electric machine.

The stator core 10 shown in FIGS. 1-2 has the stator teeth 30 on the interior, toward the common axis 16, while the first mounting ears 26 and the second mounting ears 28 are on the exterior, such that the stator core 10 will cooperate with an interior rotor (not shown). However, the elements and components described herein and illustrated with respect to the stator core 10 may also be used to construct an electric machine having an exterior rotor and interior stator, such that the stator teeth 30 may be located on the exterior of the stator core 10 and the first mounting ears 26 and second mounting ears 28 located on the interior of the stator core 10.

In the views shown in both FIG. 1 and FIG. 2, the stator core 10 is missing one of the second segments 24 from the top-most (as viewed in FIG. 1) second lamination 14. Therefore, the first segments 22 forming one of the first laminations 12, just below the top layer, are viewable in FIGS. 1-2.

Figure 3A:
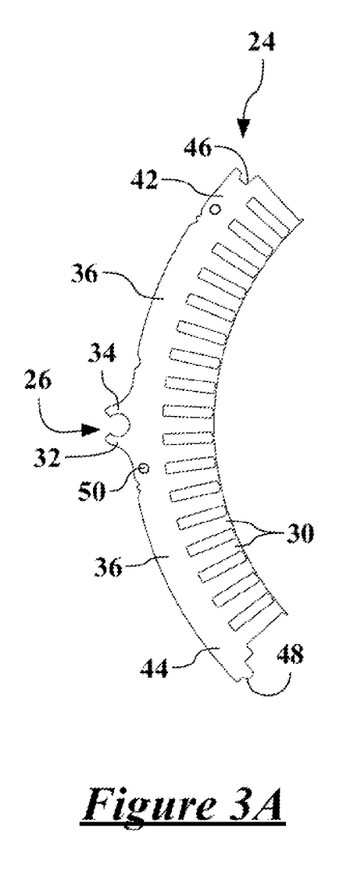
FIG. 3A is a schematic, top view of one of the second segments which may be used to construct the stator core shown in FIGS. 1-2, or stator cores similar thereto.
Figure 3B:
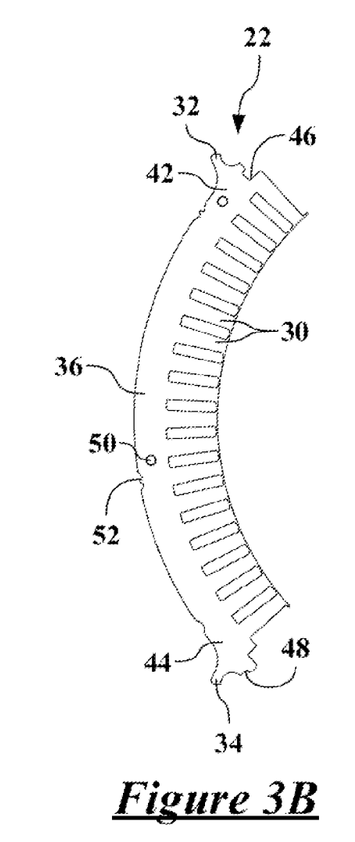
FIG. 3B is a schematic, top view of one of the first segments which may be used to construct the stator core shown in FIGS. 1-2, or stator cores similar thereto.

Referring now to FIG. 3A and FIG. 3B, and with continued reference to FIGS. 1-2, there are shown top views of one of the second segments 24 and one of the first segments 22. As shown in FIGS. 1-2, the first segments 22 and the second segments 24 may be used to construct or assemble the stator core 10 shown in FIGS. 1-2 or other stator configurations. Features and components shown in other figures may be incorporated and used with those shown in FIG. 3A and FIG. 3B.

Each of the first segments 22 and second segments 24 includes several common features. However, the first segments 22 and the second segments 24 are not identical and are configured to allow the first laminations 12 and the second laminations 14 to be rotated or offset relative to each other.

A first mounting tab 32 and a second mounting tab 34 extend from a body 36. The stator teeth 30 extend from the body 36 opposite the first mounting tab 32 and the second mounting tab 34. The body 36 provides linking structure for the features of the first segments 22 and the second segments 24 and will carry loads between the stator teeth 30 and the mounting ears 26, 28.

The first mounting tab 32 and second mounting tab 34 cooperate to form the first mounting ears 26 and the second mounting ears 28. The first mounting tab 32 and second mounting tab 34 also cooperate to define a mounting slot 38 (which may be better viewed in FIGS. 1-2). The mounting slot 38 is shaped or configured to mate with one of the locating features 20, and is closed proximal to the body 36 and open distal to the body 36. Therefore, the first mounting tab 32 and the second mounting tab 34 do not fully surround the locating feature 20 mated therewith, and the opening of the mounting slot 38 is facing away from the body 36. The opening of the mounting slot 38 is also open outward from the assembled stator core 10.

Each of the first segments 22 and the second segments 24 also includes a first end 42 of the body 36 (generally, toward the top of FIG. 3A and FIG. 3B) and a second end 44 of the body 36 (generally, toward the bottom of FIG. 3A and FIG. 3B). The first ends 42 have a first joint 46 and the second ends 44 have a second joint 48. During assembly of the stator core 10, or of the individual first laminations 12 or second laminations 14, the second joint 48 is mated with the first joint 46.

Figure 4:
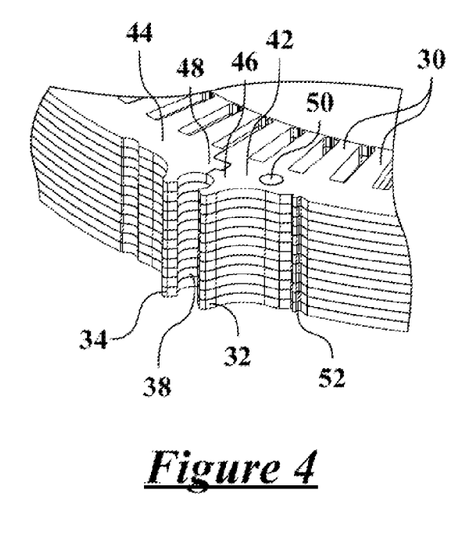
FIG. 4 is a schematic, isometric view of a joint region between stator segments, such those shown in FIGS. 1-3B.

Referring also to FIG. 4, and with continued reference to FIGS. 1-3B, there is shown a schematic, isometric view of the interface between adjacent first segments 22 or second segments 24. Note that while the view shown in FIG. 4 includes only the joint between first segments 22, the interface is representative of either the first segments 22 of the first laminations 12 or the second segments 24 of the second laminations 14. Features and components shown in other figures may be incorporated and used with those shown in FIG. 4.

As shown in FIG. 4, and also viewable in FIGS. 1-2, the first joint 46 on the first end 42 interlocks or mates with the second joint 48 on the second end 44. The second joint 48 of the second end 44 substantially overlaps one of the stator teeth 30 on the first end 42 of the adjacent first segment 22 or second segment 24.

As shown in FIGS. 1-3B, the first mounting tab 32 of the first segments 22 is located on the first end 42 adjacent the first joint 46, and the second mounting tab 34 of the first segments 22 is located on the second end 44 adjacent the second joint 48. Therefore, the first mounting ears 26 of the first laminations 12 are formed adjacent to the first joint 46 and the second joint 48, such that the first mounting ears 26 are assembled from a pair of the first segments 22. The first joint 46 and the second joint 48 generally bisect the first mounting ears 26.

The first mounting ears 26 are formed by the first mounting tab 32 and the second mounting tab 34 on adjacent ends of two of the first segments 22. However, the second mounting ears 28 of the second laminations 14 are not located on the same portion of the second segments 24.

The first mounting tab 32 of the second segments 24 is located between the first end 42 and the second end 44, and the second mounting tab 34 of the second segments 24 is located between the first end 42 and the second end 44. Therefore, the second mounting ears 28 are located between the first end 42 and the second end 44, and are formed on individual second segments 24. In the configuration of the stator core 10 shown in FIGS. 1-2, the second mounting ears 28 are located substantially equidistant from the first end 42 and the second end 44 of the second segments 24.

As shown in FIGS. 1-2, the first laminations 12 are rotated approximately forty-five degrees relative to the second laminations 14. Therefore, the first mounting ears 26 of the first laminations 12 are aligned with the second mounting ears 28 of the second laminations 14. The first mounting ears 26 and the second mounting ears 28 cooperate to further define the mounting slots 38.

As shown in FIGS. 1-2, the first laminations 12 and the second laminations 14 include features configured to assist in assembly of the first laminations 12 and the second laminations 14 into the final stator core 10. While two different assembly features are shown, additional features may be incorporated or only one feature may be used.

Each of the first segments 22 and the second segments 24 includes a plurality of interlocks 50. The plurality of interlocks 50 are configured with some form of male and female features that help interlock or create friction between adjacent first laminations 12 and the second laminations 14. In the stator core 10 shown in FIGS. 1-2 the female portion of the interlocks are viewable, and the male portion of the interlocks 50 are on the opposing side of the first segments 22 and the second segments 24 and extend into the female portions shown. The same pattern of the plurality of interlocks 50 are repeated on the first segments 22 and the second segments 24 such that first laminations 12 may be rotated relative to the second laminations 14 without altering the interlocks 50.

Each of the first segments 22 and the second segments 24 further includes a plurality of weld channels 52. The plurality of weld channels 52 assist in welding the first laminations 12 and the second laminations 14 to maintain the stacked configuration of the stator core 10 shown.

Figure 5:
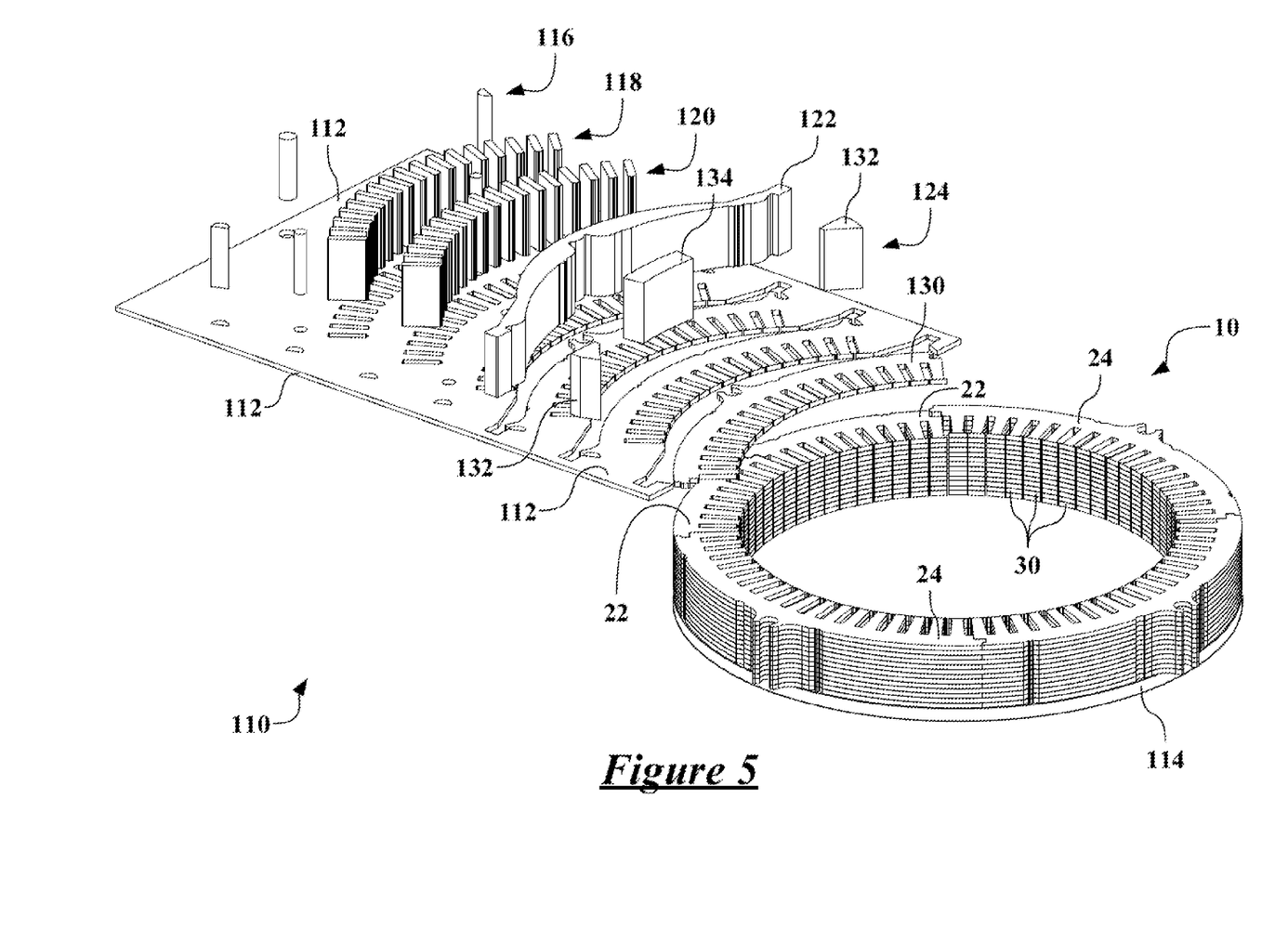
FIG. 5 is a schematic, isometric view of an illustrative apparatus for manufacturing and assembling stator cores.

Referring now to FIG. 5, and with continued reference to FIGS. 1-4, there is shown a highly-schematic, isometric view of an apparatus for producing stator cores, such as the stator core 10. FIG. 5 illustrates some of the components of a die press 110 that may be used to manufacture and assemble the stator core 10 and other configurations of stator cores. Features and components shown in other figures may be incorporated and used with those shown in FIG. 5.

A blank 112 is advanced at each of a plurality of press cycles by the die press 110. The press cycles may be defined such that, for example and without limitation, each press cycle forms a segment, such as one of the first or second segments 22, 24. The blank 112 may be substantially continuous and used to create multiple stator cores 10.

The die press 110 shapes or forms the first and second segments 22, 24, based upon a sequence. Shaping the first and second segments 22, 24 may include numerous punch steps or operations that may include one or more dies, stages or punches. The first and second segments 22, 24 are collected or assembled on a base 114, which assists in holding, forming, and ordering the first and second segments 22, 24 into the first and second laminations 12, 14 and, eventually, into the stator core 10 during the manufacturing process. The base 114 may include supports that extend through the mounting slots 38 and may be shaped similarly to the outer profile of the stator core 10.

An initial punch 116 may be activated at the beginning of each stator core 10 manufactured by the die press 110. The initial punch 116 may additionally include dies that shape features such as the plurality of weld channels 52.

A tooth punch is activated to shape the stator teeth 30 for each of the first and second segments 22, 24. The stator core 10 may be configured with asymmetric tooth profiles, such that the profile of the stator teeth 30 on the first segment 12 is different from the profile of the stator teeth 30 on the second segment 14. Therefore, the die press 110 includes both a first tooth punch 118 and a second tooth punch 120. By controlling the operating of the first tooth punch 118 and the second tooth punch 120, the continuously advancing blank 112 produces multiple, asymmetric tooth profiles.

A profile punch 122 is activated to define the inner and outer profiles of the first and second segments 22, 24. Therefore, the profile punch 122 forms an inner radius or profile and an outer radius or profile of the first or second segments 22, 24, and also forms the inner and outer diameter of the assembled first or second laminations 12, 14. In configurations that do not include asymmetric teeth, the profile punch 122 and the first tooth punch 118 (which may then be the sole tooth punch) may be incorporated into the same structure.

The die press 110 shapes one or more mounting ears for the stator core 10 with a mounting-ear punch. In the configuration shown, the profile punch 122 also incorporates the mounting-ear punch and creates both the first mounting ear 26 and the second mounting ear 28. Because both the first mounting ear 26 and the second mounting ear 28 or formed on the first and second segments 22, 24, the punch press also includes an ear-removal punch 124, which is configured to remove the unneeded mounting ears.

The die press 110 activates a joint punch (the individual die shapes are not shown but the shapes formed by the joint punch are shown), which forms or shapes the first joint 46 and the second joint 48 to mate or interlock adjacent first or second segments 22, 24. At the end of the operation sequence, the die press 110 also separates the first or second segment 22, 24 from the blank 112. The end of the blank 112 nearest the stator core 10 (as viewed in FIG. 5) is a next segment 130. The joint punch also acts as the separation punch for the die press 110.

Once separated from the steel strip or the blank 112, the next segment 130 will be pushed, or otherwise be moved, to the base 114. The gap or distance shown between the next segment 130 and the stator core 10 is illustrative only, and the blank 112 may be directly abutting the stator core 10 such that little or no travel is required to move the next segment 130 to its place in the stator core 10. The next segment 130 then becomes one of the first or the second segments 22, 24 of the stator core 10. After the first or the second segment 22, 24 produced by each press is added to the stator core 10, the base 114 is rotated.

In the stator core 10 formed by the die press 110, the first and second segments 22, 24 form the plurality of layers—the first laminations 12 and the second laminations 14—with four of each of the first and second segments 22, 24 forming one of the first and second laminations 12, 14, respectively. Therefore, the base 114 has a first rotation during assembly of one of the first laminations 12 or the second laminations 14, and has a second rotation during movement between subsequent first laminations 12 and second laminations 14.

For example, when assembling the stator core 10, the first rotation is ninety degrees between laying down individual segments—either the first segment 12 or the second segment 14—and the second rotation is forty-five degrees when switching between the first laminations 12 and the second laminations 14. In the view shown in FIG. 5, the base 114 has just rotated ninety degrees. After the next segment 130 is separated from the blank 112 to complete the first lamination 12, the base 14 will rotate forty-five degrees.

The stator core 10 manufactured by the die press 110 has a brick-layer pattern, such that adjacent first and second laminations 12, 14 are offset. Therefore, even though they are created with a single die or punch operation, the mounting ears have different locations on the first segment 22 and the second segment 24. Therefore, the die press 110 is configured to activate one of a first ear-removal punch 132 and a second ear-removal punch 134. As with the other components, designation as "first" or "second" is arbitrary and is not limiting.

The schedule for activating the first ear-removal punch 132, the second ear-removal punch 134, or both, is dependent upon the number of segments per layer and the alignment of consecutive layers relative to each other. For the stator core 10 shown in FIG. 5, the die press 110 activates the first ear-removal punch 132 for four consecutive press cycles, and activates the second ear-removal punch 134 for four consecutive press cycles.

The offset nature of the stator core 10 also affects the order of teeth profile punched into the blank 112 as it advances with each press cycle. The first tooth punch 118 has a first tooth profile, and second tooth punch has a second tooth profile different from the first tooth profile, such that the first or second segments 22, 24 have asymmetric teeth. The first tooth punch 118 is activated according to a first schedule and the second tooth punch 120 is activated according to a second schedule. However, the base 114 is rotated such that the common portions of the first tooth profile and the second profile are aligned in the assembled stator core 10.

The die press 110 is operated in a synchronized pattern to create stator cores 10 in substantially continuous cycles. Table 1 is an illustrative example of one operation pattern for the die press 110, which may be used to create the first and second segments 22, 24; assemble the first and second segments 22, 24 into the first and second laminations 12, 14; and assemble the first and second laminations 12, 14 into the stator cores 10.

In Table 1, horizontal rows illustrate individual press cycles of the die press 110 and vertical columns illustrate the consecutive operation of specific stages or punches of the die press 110. The top row of Table 1 shows the name of the punch stage and the second row shows the element number used to identify each component or punch stage in FIG. 5. The element number of the specific ear-removal punch 124 used for each cycle is shown. The amount of rotation of the base 114 is shown in degrees.

| first tooth 118 | second tooth 120 | radius 122 | ear-removal 124 | joint/ separate | base rotation 114 |
|---|---|---|---|---|---|
| ON | ON | ON | 132 | ON | 45 |
| ON | OFF | ON | 132 | ON | 90 |
| ON | OFF | ON | 132 | ON | 90 |
| ON | OFF | ON | 134 | ON | 90 |
| OFF | OFF | ON | 134 | ON | 45 |
| OFF | ON | ON | 134 | ON | 90 |
| OFF | ON | ON | 134 | ON | 90 |
| OFF | ON | ON | 132 | ON | 90 |
| ON | ON | ON | 132 | ON | 45 |
| ON | OFF | ON | 132 | ON | 90 |
| ON | OFF | ON | 132 | ON | 90 |
| ON | OFF | ON | 134 | ON | 90 |
| OFF | OFF | ON | 134 | ON | 45 |
| OFF | ON | ON | 134 | ON | 90 |
| OFF | ON | ON | 134 | ON | 90 |
| OFF | ON | ON | 132 | ON | 90 |

Figure 6:
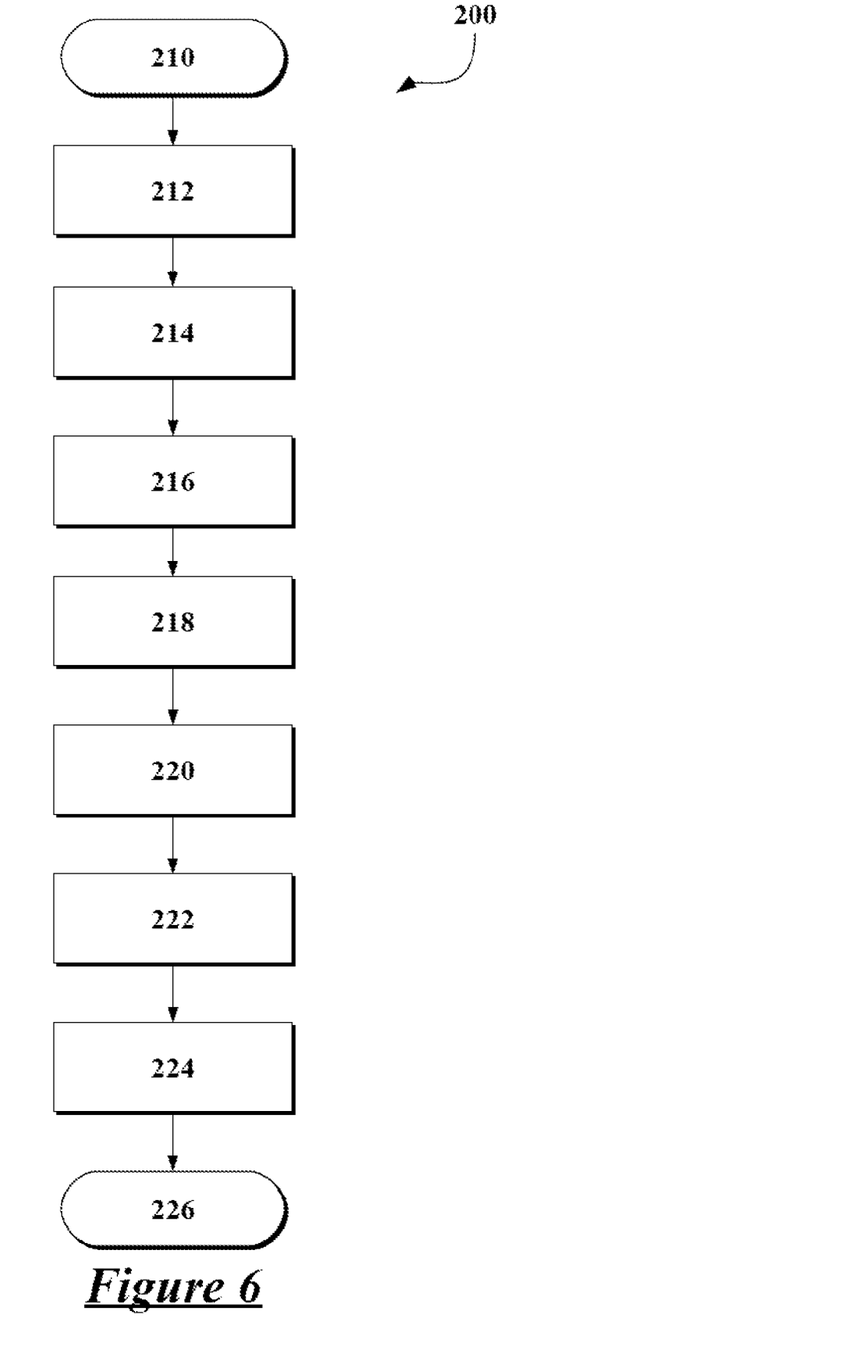
FIG. 6 is a schematic, illustrative flowchart of a method or algorithm for manufacturing and assembling stator cores.

Referring now to FIG. 6, and with continued reference to FIGS. 1-5, there is shown a schematic flow chart diagram of an algorithm or method 200 for manufacturing and assembling stator cores. The exact order of the steps of the method 200 shown in FIG. 6 is not limiting. Steps may be reordered, steps may be omitted, and additional steps may be included. Furthermore, the method 200 may be a portion or sub-routine of another algorithm or method. FIG. 6 shows only a high-level diagram of the method 200.

For illustrative purposes, the method 200 may be described with reference to the elements and components shown and described in relation to FIGS. 1-5. However, other components may be used to practice the method 200 and other components may be used to practice the invention defined in the appended claims.

Step 210: Start/Initialize.

The method 200 begins with a start or initialization step, which may include set up of the die press 110 or changing of parts or materials for the die press 110. The method 200 may operate for each press cycle or segment produced by the die press 110, or may be operating constantly as numerous, consecutive stator cores 10 are produced.

Step 212: Determine Lamination/Layer.

The method 200 includes determining the specific layer being produced by the instant press cycle. For example, the die press 110 may currently be producing the first lamination 12 or the second lamination 14.

Step 214: Determine Segment Type.

The method 200 includes determining the specific segment being produced by the instant press cycle. For example, depending upon the layer, the die press 110 may be producing either the first segment 22 or the second segment 24.

Step 216: Determine Segment Number.

When the method 200 includes producing different segments, such as the first segment 22 and the second segment 24, the method 200 will determine where the press cycle is in the sequence of segments and layers. As described herein, different punches are activated and the base 114 rotates different amounts depending upon the type of segment and the relation to the layer.

Step 218: Determine Tooth Profile.

The method 200 also determines which tooth profile will be stamped into the blank 112 on each press cycle. In the die press 110 shown in FIG. 5, there are two separate stages for the two different tooth profiles. Therefore, some press cycles include activating both the first ear-removal punch 132 and the second ear-removal punch 134.

Step 220: Execute Press/Punch Cycle.

Once the method 200 has identified the necessary punch elements for the current press cycle, the method 200 will execute that press cycle by activating all of the required or necessary punches. Force is applied and the punches advance into the blank 112, selectively removing material therefrom.

Step 222: Add/Move Segment.

After, or concurrently with, activation of the punches, the method 200 moves the next segment 130 to the stator core 10. The next segment 130 contributes to or finishes a current layer, or begins a new layer of the stator core 10.

Step 224: Rotate Core.

After the next segment 130 is moved to the stator core 10, the base 114 may be rotated to prepare for subsequent press cycles and segments. After completing layers, the base 114 rotates forty-five degrees to create the brick-layer offset. During layers, the base 114 rotates ninety degrees.

Step 226: End/Next.

The method 200 may then end or move to the next press cycle. Ending may include sending a signal that the stator core 10 is complete and may be removed from the base 114 or the die press 110, such that another stator core may be manufactured by the die press 110.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of manufacturing a stator core, comprising:
   advancing a blank at each of a plurality of press cycles, wherein each of the press cycles forms a segment;
   shaping the segments, wherein shaping the segments includes:
      activating a first tooth punch according to a first schedule, wherein the first tooth punch has a first tooth profile;
      activating a second tooth punch according to a second schedule, wherein the second tooth punch has a second tooth profile different from the first tooth profile, such that the segments have asymmetric teeth;
activating a mounting-ear punch; and
activating a joint punch;
separating the segments from the blank and moving the segments to a base; and
rotating the base.

2. The method of claim 1, wherein activating the mounting-ear punch creates a first ear and a second ear and wherein shaping the segment further includes:
activating one of a first ear-removal punch and a second ear-removal punch.

3. The method of claim 2, wherein the segments form a plurality of layers, and wherein rotating the base further includes:
a first rotation during assembly of one of the layers; and
a second rotation during movement between subsequent layers.

4. The method of claim 3, wherein shaping the segments further includes:
activating a profile punch, and
wherein the profile punch forms an inner diameter and an outer radius of the segments.

5. The method of claim 4, further comprising aligning a common portion of the first tooth profile and the second tooth profile.

6. The method of claim 5, wherein shaping the segment further includes:
activating the first ear-removal punch for four consecutive press cycles; and
activating the second ear-removal punch for four consecutive press cycles.

7. A method of manufacturing a stator core, comprising:
advancing a blank at each of a plurality of press cycles, wherein each of the press cycles forms a segment;
shaping the segments, wherein shaping the segments includes:
activating a first tooth punch having a first tooth profile;
activating the first tooth punch according to a first schedule;
activating a second tooth punch according to a second schedule, wherein the second tooth punch has a second tooth profile different from the first tooth profile;
activating a mounting-ear punch; and
activating an joint punch; and
separating the segments from the blank.

8. The method of claim 7, further comprising aligning a common portion of the first tooth profile and the second tooth profile.

9. The method of claim 8, wherein activating the mounting-ear punch creates a first ear and a second ear and wherein shaping the segment further includes:
activating one of a first ear-removal punch and a second ear-removal punch.

10. A method of manufacturing a stator core, comprising:
advancing a blank at each of a plurality of press cycles, wherein each of the press cycles forms a segment;
shaping the segments, wherein shaping the segments includes:
activating a first tooth punch according to a first schedule, wherein the first tooth punch has a first tooth profile and the first tooth punch shapes teeth in the segment;
activating a second tooth punch according to a second schedule, wherein the second tooth punch has a second tooth profile different from the first tooth profile;
activating a profile punch, wherein the profile punch shapes at least one profile of the segment;
activating a mounting-ear punch, wherein the mounting-ear punch shapes at least one mounting-ear of the segment; and
activating an joint punch, wherein the joint punch shapes at least one joint of the segment;
separating the segments from the blank and moving the segments to a base; and
rotating the base.

11. The method of claim 10, wherein activating the mounting-ear punch creates a first ear and a second ear on the segment and wherein shaping the segment further includes:
activating one of a first ear-removal punch, which removes the first ear of the segment, and a second ear-removal punch, which removes the second ear of the segment.

12. The method of claim 11, wherein shaping the segment further includes:
activating the first ear-removal punch for four consecutive press cycles; and
activating the second ear-removal punch for four consecutive press cycles.

13. The method of claim 12, further comprising aligning a common portion of the first tooth profile and the second tooth profile.

* * * * *